Oct. 11, 1966  B. B. BRIXNER  3,278,752
WIDE ANGLE OPTICAL SYSTEM HAVING A TELECENTRIC STOP AND
AN INTERFERENCE FILTER
Filed June 17, 1963  2 Sheets-Sheet 1

INVENTOR.
Berlyn B. Brixner
BY

Oct. 11, 1966  B. B. BRIXNER  3,278,752
WIDE ANGLE OPTICAL SYSTEM HAVING A TELECENTRIC STOP AND
AN INTERFERENCE FILTER
Filed June 17, 1963  2 Sheets-Sheet 2

INVENTOR.
Berlyn B. Brixner

United States Patent Office 3,278,752
Patented Oct. 11, 1966

3,278,752
WIDE ANGLE OPTICAL SYSTEM HAVING A TELECENTRIC STOP AND AN INTERFERENCE FILTER
Berlyn B. Brixner, Los Alamos, N. Mex., assignor to the United States of America as represented by the United States Atomic Energy Commission
Filed June 17, 1963, Ser. No. 288,572
4 Claims. (Cl. 250—216)

This invention relates to condensing lenses and more particularly to a lens system which will take sky light from a wide angle of view in order to monitor atmospheric fluorescence. The function of the lens system is to take this sky light, filter it with an interference filer and spread it over the surface of a phototube.

A nuclear explosion far from the earth is a strong source of low energy gamma rays that deposit their energy in the upper atmosphere and cause air fluorescence. Detection of this fluorescence can provide a method of detecting such explosions by ground instrumentation. Emission by nitrogen, caused mainly by gamma ray excitation, in the P-branch of the 3914 A. (0,0) band of the $N_2^+$ First Negative (1N) system is suitable for detection by the embodiment described herein. Hower, the novel apparatus may be used to detect emissions at other wavelengths by replacing the interference filter with others of different peak wavelengths.

In order to monitor the air fluorescence, a wide angle optical system may be used which comprises a field compressor lens on the object side of the system, a telecentric stop following said compressor lens, a condensing lens system following said stop, said condensing lens producing an image near a narrow bandpass filter and a photocell following said filter upon which the filtered light impinges. The electrical signal transformed from the nitrogen molecular emission may, by means known in the art, be amplified. Subsequently, for monitoring purposes, it may, for example, actuate an alarm or the signal may be recorded. The use to which the electrical signal is put does not form a part of this invention.

An interference filter of very narrow bandbass is used to reduce the noise level in the detecting system. Since the average wavelength of the transmission of the filter is a function of the angle of incidence, the light passing through the filter should be nearly perpendicular to the surface in order to maintain the very narrow bandpass. That is, the greater the angle from normal, the more the bandpass shifts and broadens. However, any attempt to obtain an incidence as near perpendicular as possible is met by conflicting considerations. If the angle of incidence is sought to be decreased by increasing the effective $f$-value of the lens system before the filter, it is clear that since (1) $$E = Bw \cong B\frac{\pi\left(\frac{a}{2}\right)^2}{f_2} = \text{const} \times \frac{a^2}{f^2} = \frac{\text{const}}{f^2}$$

then the illumination E is inversely proportional to the square of the $f$-value. In Equation 1 E is the illumination of the image, B is the brightness of the object, $w$ is the solid angle subtended at the image by the exit pupil, $a$ is the linear diameter of the entrance pupil and $f$ is the relative aperture or $$\frac{\text{focal length}}{a}$$

This rapid loss of illumination as the aperture is decreased places a severe limitation on this method of minimizing the incident angle at the filter. Furthermore, an attempt to decrease the angle of incidence by employing designs with lenses of smaller radii of curvature entails an increasing loss of light by reflection at acute angles as the curvature becomes greater. It has also been found that materials of a high index of refraction often exhibit poor transmission of light at the wavelengths desired. As shown by the embodiments set forth below, means have been found to alleviate this problem. The axes of the image forming light cones are perpendicular to the filter surface in all embodiments and this minimizes the angle of incidence.

Advantage may be taken of Snell's law in this connection. This may be represented by:

$$\frac{\sin i}{\sin r} = \frac{N \text{ glass}}{N \text{ air}}$$

where $i$ = angle of incidence
$r$ = angle of refraction
$N$ = index of refraction If the interference filter is encased in a material of high index of refraction, the angle of refraction $r$ will be the angle of incidence at the surface of the filter. Since the angle of incidence $i$ at the surface of the material should be relatively small, for most cases, a fair approximation may be obtained by setting the sines equal to the angles themselves, in which case:

$$\frac{i}{r} \cong \frac{N \text{ glass}}{N \text{ air}}, \ N \text{ air} = 1$$

$$r \cong \frac{i}{N \text{ glass}}$$

so that the angle of refraction (which is the angle of incidence at the filter) is reduced by approximately the value of the index of refraction of the material used.

It has been found that irregularities in cathode sensitivity may give variations in signal strength from the photocell as a function of image position. A field lens behind the filter may be used to distribute the light from each image point over a large area of the photosensitive surface. This will minimize the detrimental effect of irregularities in cathode sensitivity.

Accordingly, it is an object of this invention to provide a condensing lens system which will be useful in detecting and monitoring atmospheric fluorescence.

It is a further object of this invention to provide a condensing lens system which will detect atmospheric fluorescence over a wide angle of view, collimate these bundles of rays to such an extent as to maintain the very narrow bandpass of an interference filter and finally to direct the filtered rays over the surface of a photocell.

Other objects and advantages of this invention will be apparent to those skilled in the art from the following description and drawings.

Figure 1:
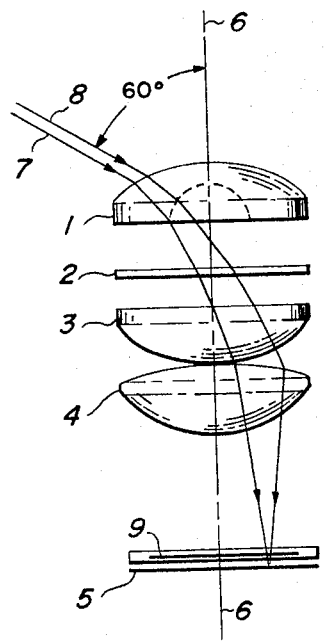
FIGURE 1 is a schematic drawing of a condensing lens system offering a field of view of 120°. Optical components and paths of light are shown.

Referring now to FIGURE 1 an optical system is shown diagrammatically. In this first embodiment of the invention, the condensing lens system is capable of receiving a bundle of light rays 7, 8 originating anywhere within a spherical angle of 120° and restricting all of the individual rays to within a small angle of incidence so that the very narrow bandpass of the interference filter 9 may be maintained. The bundle of light rays represent those at the extreme angle of incidence (60°).

The field compressor lens 1 is a polystyrene negative meniscus lens having a focal length of about −2 inches and was prepared by machining sheet stock on a lathe and polishing the optical surfaces with a water suspension of Linde-A abrasive on a lap made from a piece of ordinary leather belt. Of course other materials, such as a glass lens, would be equally satisfactory, or even superior.

The telecentric stop 2 is mounted at the front principal plane of the condensing lens combination 3 and 4 which has an equivalent focal length of 1.7 inches. The size of the aperture stop may be varied. For example, aperture stops of ⅛, ¼ and ½ inch diameter give beams with relative apertures of about $f/15$, $f/6.5$ and $f/3.8$ and maximum beam angles relative to the lens axis of 3°, 5° and 8° respectively. It is seen that any of these sizes will satisfy the small angle of incidence limitation, particularly when it is remembered that this is not the angle of incidence at the filter, but rather that in air. These angles will be further reduced by approximately the index of refraction of the material covering the filter.

Lens 3 is a Bausch and Lomb Cinephor condensing lens #41–86–21 (3¼ in. diam., $f=3$ in.) and lens 4 is a Bausch and Lomb condensing lens #41–90–01–002 (3.1 in. diam., $f=3½$ in.). Lens 3 is aspheric, a factor which contributes to the excellent off-axis beam quality at the phototube 5. The surface of the tube 5, with a commercially available very narrow bandpass filter 9 immediately in front of it, is placed at the focal plane of the assembled condensing lens. The equivalent focal length of the complete lens is about 0.9 inch. The surface of the photocell is shown as flat but this is not necessary for operability. It should be noted that in this, as in the other models, the axes of the image forming light cones are all perpendicular to the filter surface. The lens system need not be corrected for chromatic aberration. However in this, as in all other embodiments, the lens system is corrected quite well for monochromatic aberrations (also known as the five Seidel aberrations).

Table I sets forth the prescription for the lens system of FIGURE 1.

TABLE I
[Polystyrene, $N_D=1.59$]

| Article | d | $r_1$ | $r_2$ |
| --- | --- | --- | --- |
| 1 | 0.25 | 2.5 | ⅝ |

$r_1$=radius of curvature at front of lens, in.
$r_2$=radius of curvature at rear of lens, in.
$d$=distance through lens at axis, in.

Figure 2:
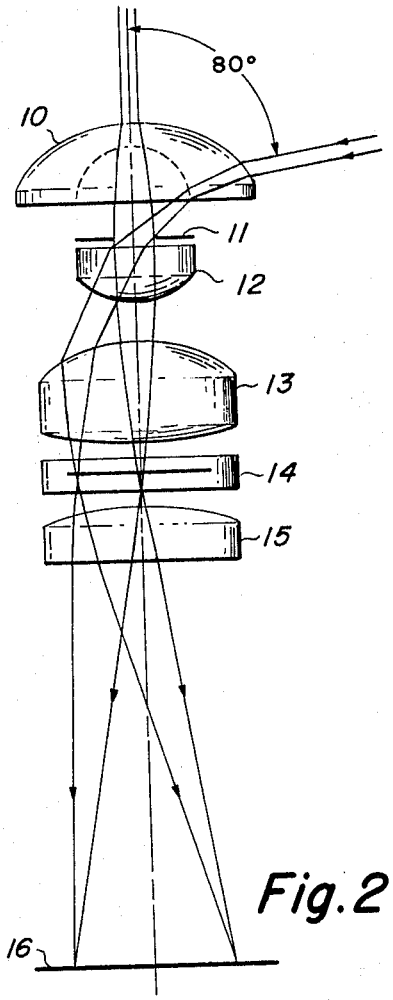
FIGURE 2 is a schematic drawing of an improved condensing lens system offering a 160° field of view and a field lens to spread the rays over the surface of a photocell.

FIGURE 2 describes a revised model of the wide angle optical condenser of FIGURE 1. The design criteria for this embodiment are more restrictive. The requirement of minimum angle of incidence consistent with an $f/2.8$ optical aperture of the rays at the image has been maintained but the angle of view has been increased to 160° and the maximum ratio of image brightness from the center to the edge of the field of view has been set at 2 to 1. This embodiment, as in that of FIG. 1, uses a field compressor 10 to reduce the angle of incidence of light from the sky on the plane of the aperture stop and a large aperture condenser to permit the use of a telecentric stop to control the direction of the lateral image cones. The axes of these image forming light cones are all perpendicular to the filter surface. Condensing lenses 12 and 13 produce an image at the filter 14. It is not necessary that the image be formed at the filter, only that the angle of incidence be minimized. In order to minimize this angle of incidence the lens system has been designed so that the axes of the image forming light cones are perpendicular to the filter surface.

The use of field lens 15 represents a distinct improvement over the design of FIGURE 1 since this lens images stop 11 at the phototube surface 16 so that light from any image point is distributed over a large area of the photosensitive surface. This minimizes variations in signal strength as a function of image position which is caused by irregularities in the cathode sensitivity of commercially available photocells. A 4060 A. extra narrow bandpass interference filter and an $f/2.8$ optical aperture was used in this particular embodiment. The use of an $f/2.8$ aperture results in an angle of incident at the material encasing the filter of 10°7′. This angle is considered within acceptable limits (considering the effect of the angle of incidence in widening the bandpass of the interference filter) when it is remembered that this is the air angle and will be further reduced by the material encasing the filter. Table II sets forth the detailed scheme used in this embodiment.

TABLE II
[Polystyrene, $N_D=1.59$]

| Article | d | D | $r_1$ | $r_2$ |
| --- | --- | --- | --- | --- |
| 10 | 0.150 |  | +1.130 | +0.400 |
|  |  | 0.750 |  |  |
| 12 | 0.459 |  | Plano | −0.539 |
|  |  | 0.180 |  |  |
| 13 | 0.800 |  | +1.000 | −3.424 |
|  |  | 0.125 |  |  |
| 14 (Enclosed Filter) | 0.250 |  |  |  |
|  |  | 0.125 |  |  |
| 15 | 0.400 |  | +2.200 | Plano |

$r_1$=radius of curvature at front of lens, in.
$r_2$=radius of curvature at rear of lens, in.
$D$=distance between articles, in.
$d$=distance through lens at axis, in.

This lens scheme permits the use of a wide variety of materials of different refractive index such as quartz, hard crown glass, polystyrene, flint glass, or one of the rare earth glasses. However, when it is desirable to increase the aperture from $f/2.8$ to $f/1.0$, polystyrene is not a preferred material since the blue light transmission characteristics of polystyrene are relatively poor and therefore there is an unnecessary loss of light. Furthermore this material is soft and will not stand the outdoor weathering required of the instrument. It is thus preferable to use a hard, weather-resistant material such as borosilicate crown glass. In addition it has been found that when an atmospheric fluorescence band in the violet or ultraviolet regions (e.g., 3914 A.) is being used, fused quartz has appreciably higher light transmission than the borosilicate crown and is therefore preferable. However, the obtention of this increased light transmission by increasing the aperture is accompanied by a drawback in that the angle of incidence is appreciably increased (to about 26°34′). It should, of course, be remembered that this is the air angle and could be reduced by the material selected to encase the filter. It is therefore seen that while an advantage is obtained in either system, this is unavoidably accomplished by disadvantage. Selection of the system to be used may then depend on other factors. For example, the available photomultipliers may be too sensitive for the increased light transmission at $f/1.0$ and thereby normal daylight conditions would make the system too noisy.

Figures 3, 4:
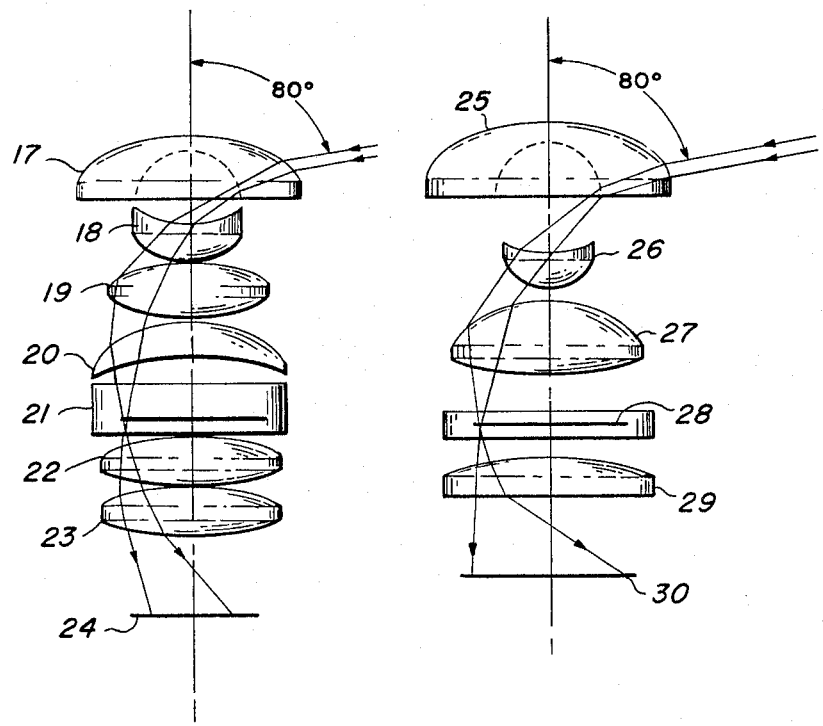
FIGURE 3 is a schematic drawing of another improved condensing lens system which features increased light transmission.
FIGURE 4 is a schematic drawing of a condensing lens system utilizing borosilicate crown glass.

FIGURE 3 represents an improved wide-angle condensing lens, 0.47 inch, $f/1.0$, for use with an atmospheric-fluorescence monitoring instrument. The advantage of this embodiment over that of the 0.4 inch, $f/2.8$ system of FIGURE 2 is that enlargement of the relative aperture has increased the normal light transmission by about a factor of 8. In addition a further gain has been obtained by using fused quartz with its relatively high light transmission in the violet and ultraviolet regions. When using a compressor lens 17 adapted for 160° angle field of view the increased aperture of $f/1.0$ made it necessary to use 5 lens elements to obtain satisfactory performance. Condensing lenses 18, 19 and 20 form an image at the extra-narrow-band interference filter 21. The axes of the image-forming light cones are all perpendicular to the filter surface 21 and field lenses 22 and 23 redirect all the light cones to spread on the phototube surface 24.

Table III sets forth the detailed lens prescription for the embodiment of FIGURE 3.

TABLE III

[Fused quartz, $N_D=1.46$]

| Article | d | D | $r_1$ | $r_2$ |
|---|---|---|---|---|
| 17 | 0.10 | 0.55 | +1.100 | +0.400 |
| 18 | 0.31 | 0.00 | −0.800 | −0.484 |
| 19 | 0.40 | 0.00 | +1.257 | −1.282 |
| 20 | 0.40 | 0.10 | +0.863 | +7.436 |
| 21 (Enclosed Filter) | 0.40 | 0.00 | | |
| 22 | 0.34 | 0.00 | +1.642 | −2.197 |
| 23 | 0.34 | | +1.642 | −2.197 | d=distance through lens at axis, in.
D=distance between articles, in.
$r_1$=radius of curvature at front of lens, in.
$r_2$=radius of curvature at rear of lens, in.

FIGURE 4 is a schematic drawing of a lens system whose prescription is set forth in Table IV. Borosilicate crown glass ($N_D=1.517$) was employed in this system. In this system, light bundles from a 160° field of view are gathered by the compressor lens 25, passed through the condensing lens 26 and 27, filtered through a very narrow bandpass filter 28 and field lens 29 spreads the filtered rays over the surface of the photocell 30.

TABLE IV

[Borosilicate glass, $N_D=1.517$]

| Article | d | D | $r_1$ | $r_2$ |
|---|---|---|---|---|
| 25 | 0.15 | 0.75 | +1.300 | +0.426 |
| 26 | 0.30 | 0.17 | −2.000 | −0.409 |
| 27 | 0.50 | 0.25 | +1.000 | −1.536 |
| 28 (Enclosed Filter) | 0.25 | 0.125 | | |
| 29 | 0.30 | | +1.924 | Plano | d=distance through lens at axis, in.
D=distance between articles, in.
$r_1$=radius of curvature at front of lens, in.
$r_2$=radius of curvature at rear of lens, in.

This 0.43 in., f/2.8 borosilicate crown glass system possesses several advantages over that of the 0.4 in., f/2.8 system of FIGURE 2. For example, the borosilicate crown glass is more resistant to weathering effects and has better blue light transmission characteristics than polystyrene.

It is thus seen that a wide angle optical system described herein is capable of monitoring atmospheric fluorescence. It is also apparent that the embodiments described above are merely preferred and that changes and modifications may be made therein without departing from the spirit and scope of the invention as hereinafter claimed.

What is claimed is:
1. A wide angle optical system comprising:
   (a) a negative meniscus field compressor lens on the object side of the system being convex towards the object,
   (b) a telecentric stop following said compressor lens,
   (c) positive condensing lens means following said stop with its first principal focal plane coinciding with the position of said stop, and a very narrow bandpass interference filter on the image side of the condensing lens means,
   (d) said condensing lens means causing the chief rays of all image-forming light cones to be about perpendicular to the surface of said very narrow bandpass interference filter.
2. A wide angle optical system as in claim 1 wherein the condensing lens means produce an image at the filter.
3. A wide angle optical system as in claim 1 wherein a photocell is placed behind the filter so that the filtered light rays impinge on the surface of said photocell.
4. A wide angle optical system as in claim 3 wherein field lens means are placed between the filter and the photocell, said field lens means causing the light from each image point to spread over a large area of the photo-sensitive surface.

References Cited by the Examiner

UNITED STATES PATENTS

| 2,003,881 | 6/1935 | Grosset et al. |
| 2,391,430 | 12/1945 | Macek. |
| 2,651,970 | 8/1953 | Tiller. |
| 2,959,099 | 11/1960 | Billard et al. _____ 88—57 |
| 3,209,073 | 8/1965 | Falbel _____ 88—57 X |

FOREIGN PATENTS

| 717,621 | 2/1942 | Germany. |

JEWELL H. PEDERSEN, *Primary Examiner.*

JOHN K. CORBIN, *Examiner.*